T. B. EASBY & D. V. LOUVET.
FISH SCALER.
APPLICATION FILED JUNE 5, 1917.
1,236,369.
Patented Aug. 7, 1917.
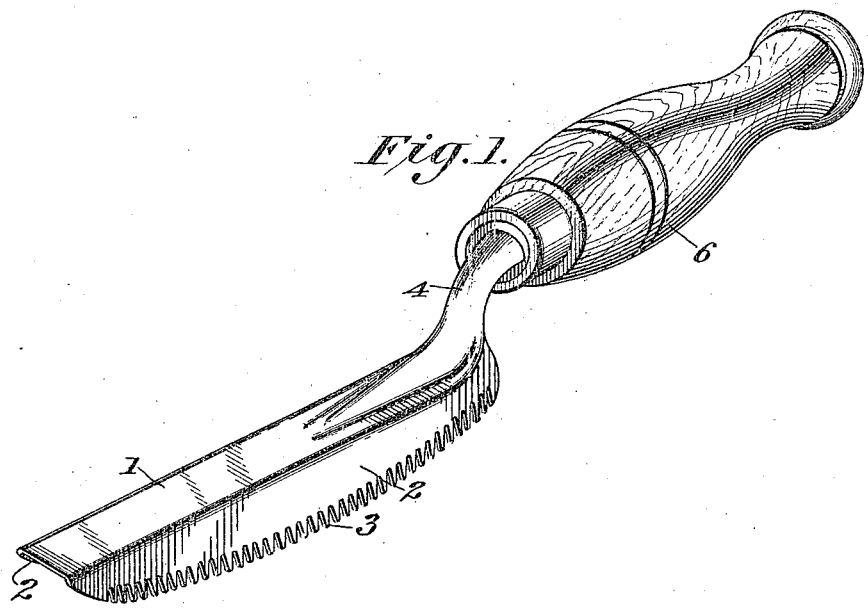
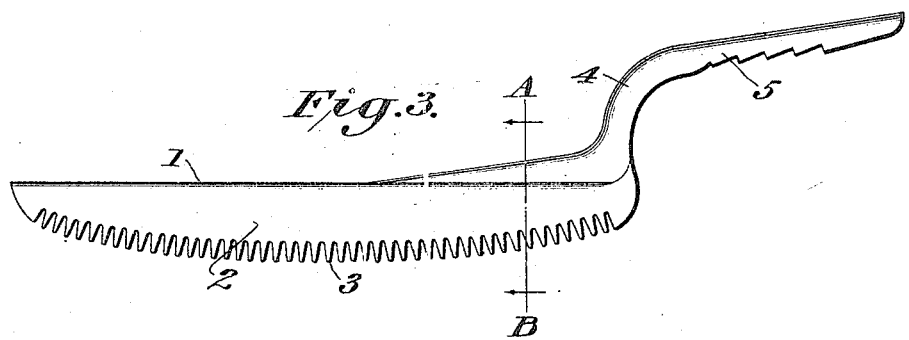
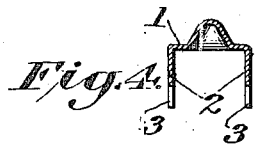
Inventors
Thomas Barton Easby
Desire Victor Louvet
by Finckel Attorney

UNITED STATES PATENT OFFICE.

THOMAS BARTON EASBY, OF BROOKLYN, AND DESIRE VICTOR LOUVET, OF RICHMOND HILL, NEW YORK, ASSIGNORS TO NEW YORK STAMPING COMPANY, OF BROOKLYN, NEW YORK, A CORPORATION OF NEW YORK.

FISH-SCALER.

1,236,369. Specification of Letters Patent. Patented Aug. 7, 1917.

Application filed June 5, 1917. Serial No. 172,903.

*To all whom it may concern:*

Be it known that we, THOMAS BARTON EASBY, a citizen of the United States, residing at Brooklyn, in the county of Kings and State of New York, and DESIRE VICTOR LOUVET, a citizen of the United States, residing at Richmond Hill, in the county of Queens and State of New York, have invented a certain new and useful Improvement in Fish-Scalers, of which the following is a full, clear, and exact description.

The object of this invention is to provide a simple, efficient and durable implement for removing the scales from fish, and commonly known as a "fish scaler".

The invention consists of a fish scaler, preferably of channel or inverted U shape in cross-section, having parallel blades and a connecting web or back which is provided with an extension to form a tang or handle member integral therewith and projecting therefrom in the direction of the length of the blades, the construction being such that the implement may be used for removing the scales from fish by lateral movements, as we will proceed now to explain and finally claim.

In the accompanying drawings illustrating the invention, in the several figures of which like parts are similarly designated, Figure 1 is a perspective view of one form of the complete implement. Fig. 2 is a top plan view with the handle or grip removed. Fig. 3 is a side view of the parts shown in Fig. 2. Fig. 4 is a transverse section on the line A B of Fig. 3.

A blank of suitable construction is made and formed into a body of channel or inverted U shape, having a back 1 and two parallel blades 2, each of the blades having convex active edges and provided, if desired, with suitable teeth 3, and a tang or handle member 4, all in one integral piece.

Preferably the edges of the teeth 3 are rounded so as not to cut into the skin or flesh of the fish. These teeth are sufficiently close together to insure the rapid and complete removal of the scales from the fish.

The web or back 1 has the tang or handle member 4 formed integral therewith by embossing or pressing the metal to shape, substantially in concavo-convex form, as indicated in the drawings, thereby incidentally stiffening and strengthening the parts. The outer edges of the tang may be provided with teeth 5 to engage the handle or grip 6 into which the tang is driven. The tang or handle member may be raised from the level of the back and at a suitable angle thereto to receive the handle or grip at such an elevation above the blades themselves as to enable the user to employ the scaler without his hand coming into contact with the fish being scaled and to afford a free and unobstructed channel from end to end of the blades. The handle or grip may be made of wood or other material suitable for the purpose.

As will be observed, both the tang and the handle or grip are in longitudinal alinement with the blades, so that in operation the implement may be and is intended to be drawn lengthwise of the fish transversely of the length of the implement, much as a knife is used in scaling fish.

The implement may be blanked out of metal, in a single piece, and stamped to shape, by means of dies, preferably in a single operation, in an economical and efficient manner, and then finished in any desirable way. Such a construction involves not only economy in manufacture, but also provides an efficient scaler that may be readily cleaned after use, and kept in a clean and sanitary condition, there being no parts in which lodgment of refuse may occur.

Variations in details of construction are permissible within the scope of the invention as herein claimed.

What we claim is:—

1. A fish scaler, comprising blades and a connecting web, the web being extended in the direction of the length of said blades to form a tang or handle member, and said scaler having an unobstructed open channel from end to end between its blades whereby lodgment of refuse is avoided.

2. A fish scaler, comprising a pair of parallel blades and a connecting web, said web being extended in the direction of the length of said blades to form a tang or handle member, said tang or handle member being diverted from the plane of said web, and a free open channel being formed from end to end of the scaler between the blades and lodgment of refuse thereby avoided.

3. A fish scaler, comprising a pair of blades and a connecting web, said web being extended in the direction of the length of said blades to form a tang or handle member raised above the plane of said web and embossed to substantially concavo-convex form in cross-section, the construction providing an inverted channel extending unobstructedly from end to end of the blades and thereby preventing lodgment of refuse.

In testimony whereof we have hereunto set our hands this first day of June, A. D. 1917.

THOMAS BARTON EASBY.
DESIRE VICTOR LOUVET.

Witnesses:
HENRY G. ENGSTROM,
EDMUND SCHMIER.

Copies of this patent may be obtained for five cents each, by addressing the "Commissioner of Patents, Washington, D. C."